(12) United States Patent
Toyoda et al.

(10) Patent No.: US 6,259,533 B1
(45) Date of Patent: *Jul. 10, 2001

(54) FACSIMILE APPARATUS FOR TRANSMITTING FACSIMILE DATA AS AN ELECTRONIC MAIL AND ELECTRONIC MAIL TRANSMITTING METHOD

(75) Inventors: Kiyoshi Toyoda; Tatsuo Bando, both of Tokyo (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/137,839

(22) Filed: Aug. 21, 1998

Related U.S. Application Data

(62) Division of application No. 08/734,321, filed on Oct. 21, 1996, now Pat. No. 5,812,278.

(30) Foreign Application Priority Data

Oct. 20, 1995 (JP) .................................................. 7-272697
Oct. 26, 1995 (JP) .................................................. 7-278836

(51) Int. Cl.$^7$ ...................................................... H04N 1/32
(52) U.S. Cl. ............................ 358/1.15; 358/403; 358/407
(58) Field of Search ............................ 358/1.15, 402, 358/403, 407, 434, 440, 442, 468; 379/93.24, 100.08, 100.13, 93.15

(56) References Cited

U.S. PATENT DOCUMENTS

| | | | |
|---|---|---|---|
| 4,941,170 | * 7/1990 | Herbst | 379/100.07 |
| 5,115,326 | * 5/1992 | Burgess et al. | 358/440 |
| 5,247,591 | * 9/1993 | Baran | 382/179 |
| 5,299,255 | * 3/1994 | Iwaki et al. | 379/93.24 |
| 5,339,156 | * 8/1994 | Ishii | 358/402 |
| 5,400,335 | * 3/1995 | Yamada | 370/524 |
| 5,461,488 | * 10/1995 | Witek | 358/402 |
| 5,521,719 | * 5/1996 | Yamada | 358/438 |
| 5,553,145 | * 9/1996 | Micali | 380/30 |
| 5,712,907 | * 1/1998 | Wegner et al. | 379/112 |
| 5,767,985 | * 6/1998 | Yamamoto et al. | 358/402 |
| 5,802,314 | * 9/1998 | Tullis et al. | 709/246 |
| 5,812,278 | * 9/1998 | Toyoda et al. | 358/402 |

* cited by examiner

Primary Examiner—Edward Coles
Assistant Examiner—Joseph R. Pokrzywa
(74) Attorney, Agent, or Firm—Israel Gopstein

(57) ABSTRACT

When facsimile data of a transmitter's facsimile is received in a facsimile apparatus, a facsimile number specifying the transmitter's facsimile and a receiver's electronic mail address included in the facsimile data are recognized in a CPU, a user's name specifying a transmitter's electronic mail address in the facsimile apparatus is generated in a mail address generating unit according to the facsimile number, an image format of the facsimile data is converted into a mail format of electronic mail data, the user's name, the facsimile number and the receiver's electronic mail address are added to the electronic mail data, and the electronic mail data is transmitted from the facsimile apparatus to the receiver. Therefore, even though a transmission error occurs in the electronic mail data and error information is returned to the facsimile apparatus, the transmitter's facsimile can be specified according to the user's name, and the error information can be correctly transmitted to the transmitter's facsimile.

12 Claims, 10 Drawing Sheets

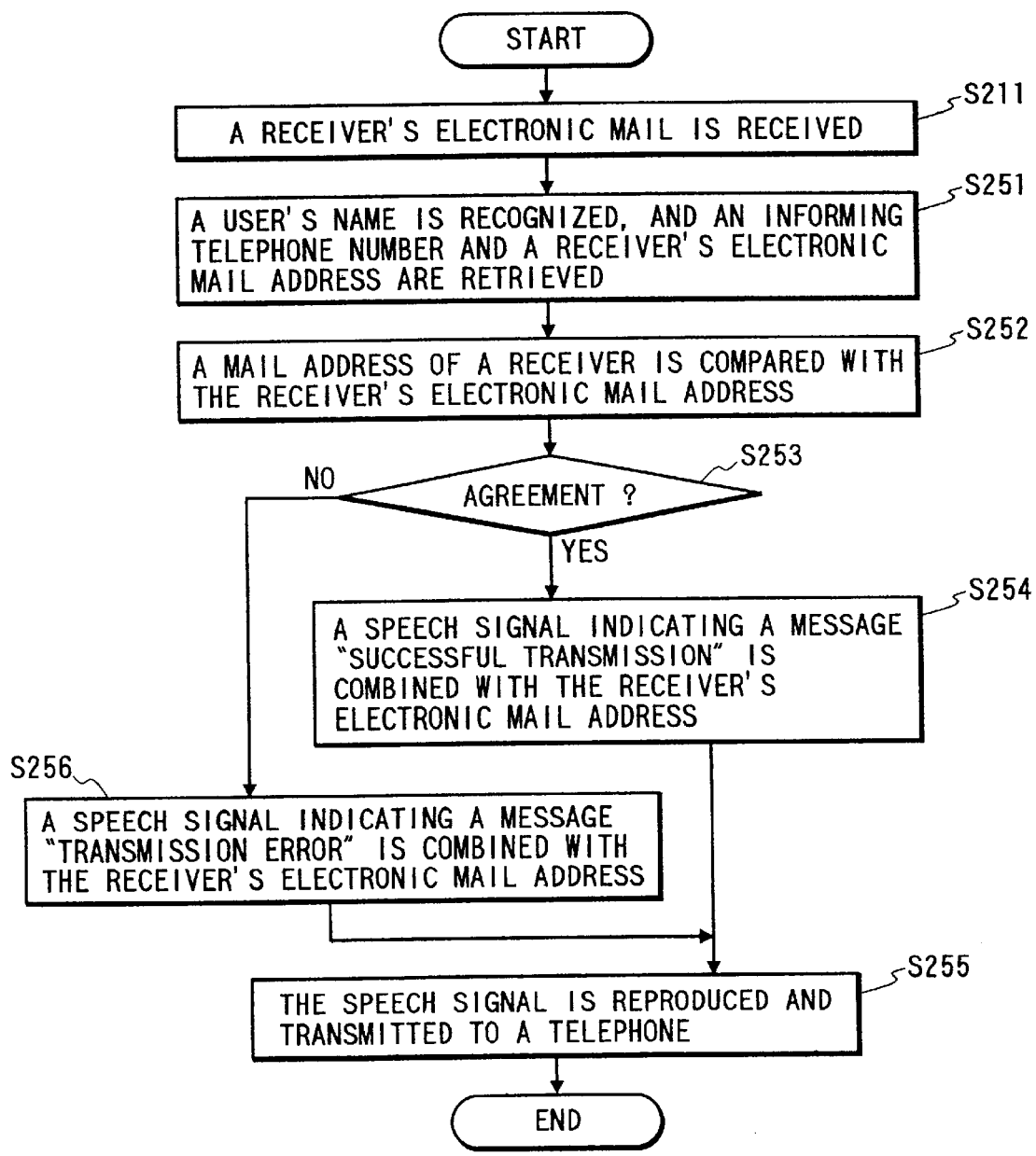

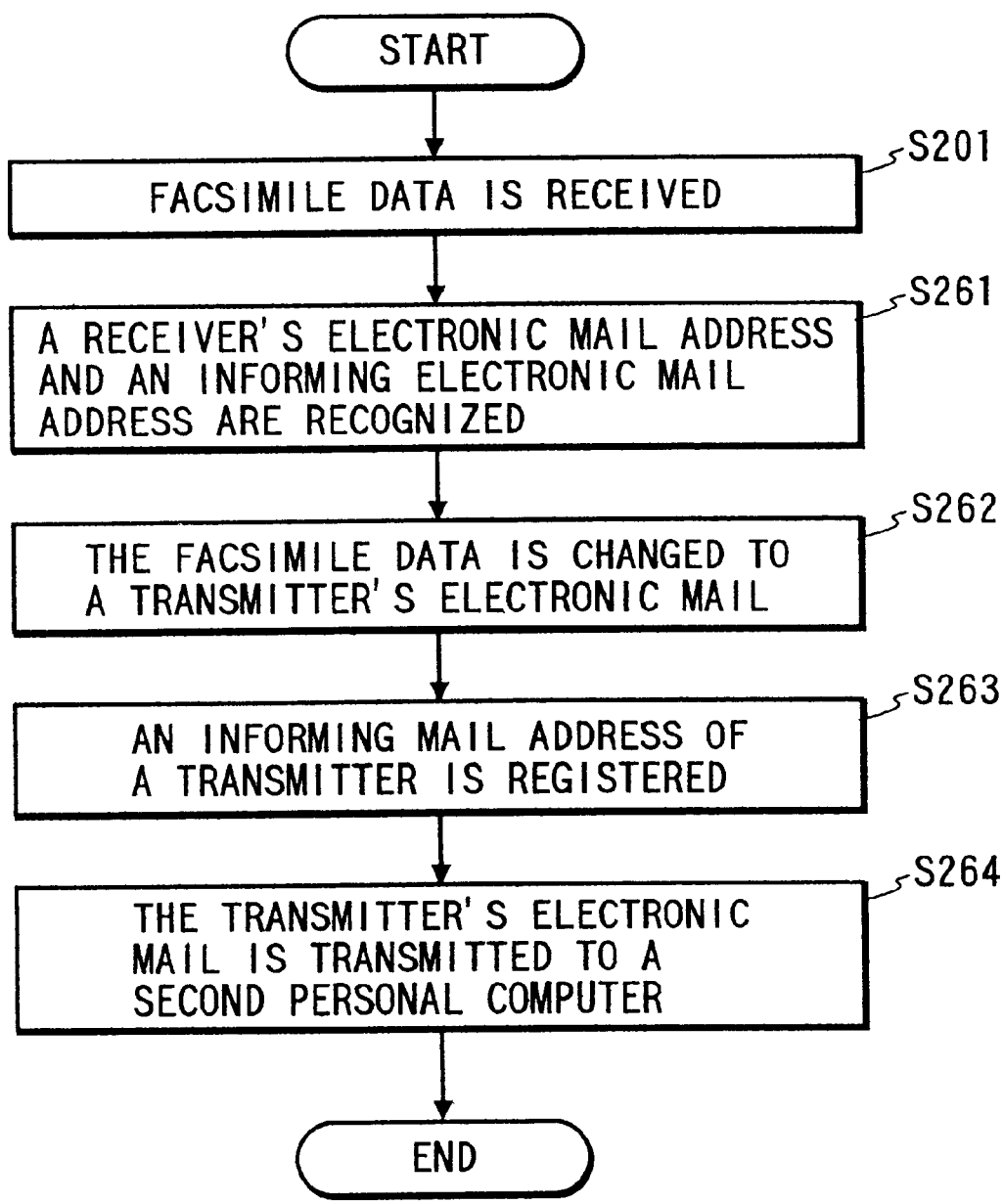

FACSIMILE APPARATUS FOR TRANSMITTING FACSIMILE DATA AS AN ELECTRONIC MAIL AND ELECTRONIC MAIL TRANSMITTING METHOD

CROSS-REFERENCES TO RELATED APPLICATIONS

This is a divisional application of U.S. patent application Ser. No. 08/734,321 filed on Oct. 21, 1996 now U.S. Pat. No. 5,812,278.

BACKGROUND OF THE INVENTION

1. Field of the Invention

The present invention relates to a facsimile apparatus and an electronic mail transmitting method in which facsimile data prepared in a facsimile is transmitted to an electronic mail apparatus as an electronic mail.

2. Description of the Related Art

An apparatus installed in an office has been recently connected with a local area network (LAN) to efficiently conduct business. For example, a facsimile apparatus in which a facsimile is connected with the LAN and image data transmitted from the facsimile is transmitted to a destination by an electronic mail through the LAN is proposed. As an example, a facsimile apparatus connecting an integrated services digital network (ISDN) and an LAN is proposed in a Published Unexamined Japanese Patent Application No. H6-164645 (1994), and image data transmitted through the ISDN is transmitted to an address of an electronic mail indicated by a sub-address of the ISDN.

2.1. Previously Proposed Art

FIG. 1 is a block diagram of a conventional facsimile apparatus in which facsimile data received through a telephone line is transmitted to an address of an electronic mail.

As shown in FIG. 1, a facsimile apparatus 120 is composed of a CPU 121 for controlling the facsimile apparatus 120, a ROM 122 for storing a program, a RAM 123 for storing data used for the program, a facsimile data receiving and transmitting unit 124 for receiving facsimile data transmitted through a telephone line or transmitting facsimile data to the telephone line, a format converting unit 125 for converting a format in the facsimile data received by the facsimile data receiving and transmitting unit 124 to a format of an electronic mail to obtain electronic mail data, and an LAN controlling unit 126 for receiving an electronic mail transmitted through an LAN or transmitting the electronic mail data obtained in the format converting unit 125.

In the above configuration of the facsimile apparatus 120, when facsimile data transmitted from a transmitting side through the telephone line is received in the facsimile data receiving and transmitting unit 124, an address of an electronic mail is retrieved according to a number of a sub-address of the ISDN by using a corresponding table of registered numbers and mail addresses, the facsimile data is converted to electronic mail data by the format converting unit 125, and the electronic mail data is transmitted to a receiving side placed at the address of the electronic mail through the LAN controlling unit 126.

2.2. Problems to be Solved by the Invention

However, in the facsimile apparatus 120, in cases where a transmission error of the electronic mail occurs, the facsimile apparatus 120 cannot inform the facsimile of the transmitting side that the transmission error occurs. Therefore, a sender cannot know whether or not a manuscript read by the facsimile is correctly transmitted to the receiving side.

SUMMARY OF THE INVENTION

An object of the present invention is to provide, with due consideration to the drawbacks of such a conventional facsimile apparatus, a facsimile apparatus which informs a transmitting side of the occurrence of a transmitting error in cases where the transmitting error of an electronic mail occurs.

The object is achieved by the provision of a facsimile apparatus, comprising:

facsimile receiving means for receiving facsimile data;

recognizing means for recognizing a transmitter's address and a receiver's electronic mail address which are included in the facsimile data received by the facsimile receiving means;

storing means for storing the transmitter's address and the receiver's electronic mail address recognized by the recognizing means and an electronic mail address specified in the facsimile apparatus in correspondence to each other;

changing means for changing the facsimile data received by the facsimile receiving means to electronic mail data;

electronic mail transmitting means for transmitting the electronic mail data changed by the changing means; and control means for adding the specified electronic mail address stored in the storing means to the electronic mail data as transmitter's information and controlling the electronic mail transmitting means to transmit the electronic mail data changed by the changing means with the specified electronic mail address.

The object is also achieved by the provision of an electronic mail transmitting method, comprising the steps of:

receiving facsimile data;

recognizing a transmitter's address of the facsimile data;

storing the transmitter's address, a receiver's electronic mail address and an electronic mail address specified in the facsimile apparatus in correspondence to each other;

changing the facsimile data to electronic mail data;

setting the specified electronic mail address as a transmitter address of the electronic mail data; and transmitting the electronic mail data with the specified electronic mail address as a first electronic mail.

In the above configuration and steps, when facsimile data transmitted from a transmitter is received by the facsimile receiving means, a transmitter's address and a receiver's electronic mail address included in the facsimile data are recognized by the recognizing means. Thereafter, an electronic mail address indicating transmitter's information is prepared in the facsimile apparatus to specify the transmitter, and the transmitter's address and the receiver's electronic mail address are stored in the storing means in correspondence to the electronic mail address. Thereafter, the facsimile data is changed to electronic mail data by the changing means, the specified electronic mail address is added to the electronic mail data as the transmitter's information under the control of the control means, and the electronic mail data with the specified electronic mail address is transmitted to a receiver by the electronic mail transmitting means under the control of the control means.

Accordingly, even though an error occurs in the transmission of the electronic mail data and error information informing of the occurrence of the error is sent with the specified electronic mail address to the facsimile apparatus, because the transmitter's information indicated by the specified electronic mail address is analyzed in the facsimile apparatus to specify the transmitter, the error information can be reliably sent from the facsimile apparatus to the transmitter. Therefore, the transmitter can reliably know the occurrence of the error in the transmission of the electronic mail data.

Also, any user other than the transmitter cannot specify the transmitter of the electronic mail data even though the user analyzes the specified electronic mail address transmitted with the electronic mail data.

The object is also achieved by the provision of a facsimile apparatus, comprising:

facsimile receiving means for receiving facsimile data;

recognizing means for recognizing a receiver's electronic mail address of the facsimile data received by the facsimile receiving means;

storing means for storing the receiver's electronic mail address recognized by the recognizing means and an electronic mail address specified in the facsimile apparatus in correspondence to each other;

changing means for changing the facsimile data received by the facsimile receiving means to electronic mail data; and electronic mail transmitting means for setting the specified electronic mail address stored in the storing means as a transmitter's address of the electronic mail data changed by the changing means and transmitting the electronic mail data with the specified electronic mail address.

In the above configuration, even though an error occurs in the transmission of the electronic mail data performed by the electronic mail transmitting means and error information informing of the occurrence of the error in the transmission of the electronic mail data is sent to the facsimile apparatus, because the specified electronic mail address transmitted with the electronic mail data is set as a transmitter's address of the electronic mail data by the electronic mail transmitting means, the transmitter's address of the electronic mail data is detected, so that the error information can be reliably sent from the facsimile apparatus to the transmitter. Therefore, the transmitter can reliably know the occurrence of the error in the transmission of the electronic mail data.

Also, because the transmitter's address of the electronic mail data is not transmitted with the electronic mail data, any user cannot specify the transmitter of the electronic mail data even though the user analyzes the specified electronic mail address transmitted with the electronic mail data.

The object is also achieved by the provision of a facsimile apparatus, comprising:

a facsimile data communicating unit for receiving facsimile data;

a mail address generating unit for generating an electronic mail address to be able to be specified in the facsimile apparatus when the facsimile data is received by the facsimile data communicating unit;

a random access memory for storing a transmitter's address and a receiver's electronic mail address, which are included in the facsimile data received by the facsimile data communicating unit, and the specified electronic mail address generated by the mail address generating unit in correspondence to each other;

a format converting unit for converting the facsimile data received by the facsimile data communicating unit into electronic mail data;

a local area network control unit for transmitting the electronic mail data converted by the format converting unit; and a central processing unit for recognizing the transmitter's address and the receiver's electronic mail address of the facsimile data received by the facsimile data communicating unit, controlling the random access memory to store the specified electronic mail address generated by the mail address generating unit, the recognized transmitter's address and the recognized receiver's electronic mail address in correspondence to each other, adding the specified electronic mail address generated by the mail address generating unit to the electronic mail data converted by the format converting unit as transmitter's information and controlling the local area network control unit to transmit the electronic mail data with the specified electronic mail address.

In the above configuration, when facsimile data transmitted from a transmitter is received by the facsimile data communicating unit, an electronic mail address is generated by the mail address generating unit to specify a transmitter of the facsimile data in the facsimile apparatus, a transmitter's address and a receiver's electronic mail address included in the facsimile data are recognized under the control of the central processing unit (CPU), the transmitter's address and the receiver's electronic mail address are stored in the random access memory in correspondence to the electronic mail address under the control of the CPU. Thereafter, the facsimile data is converted into electronic mail data by the format converting unit, the specified electronic mail address is added to the electronic mail data as transmitter's information under the control of the CPU, and the local area network control unit transmits the electronic mail data with the specified electronic mail address under the control of the CPU.

In the above configuration, because the specified electronic mail address is added to the electronic mail data as transmitter's information, even though an error occurs in the transmission of the electronic mail data and error information informing of the occurrence of the error in the transmission of the electronic mail data is sent to the facsimile apparatus, the transmitter's information of the electronic mail data is analyzed in the facsimile apparatus to specify the transmitter of the electronic mail data, so that the error information can be reliably sent from the facsimile apparatus to the transmitter. Therefore, the transmitter can reliably know the occurrence of the error in the transmission of the electronic mail data.

Also, because the transmitter's information of the electronic mail data is not transmitted with the electronic mail data, any user cannot specify the transmitter of the electronic mail data even though the user analyzes the specified electronic mail address transmitted with the electronic mail data.

BRIEF DESCRIPTION OF THE DRAWINGS

The objects, features and advantages of the present invention will be apparent from the following description taken in conjunction with the accompanying drawings, in which:

FIG. 12 is a flow chart showing an operation performed by the facsimile apparatus shown in FIG. 11 according to a seventh embodiment when a receiver's electronic mail transmitted from a personal computer of a receiver is returned to the facsimile apparatus; and FIG. 13 is a flow chart showing an operation performed by the facsimile apparatus shown in FIG. 3 according to a eighth embodiment when facsimile data is received in the facsimile apparatus.

DETAILED DESCRIPTION OF THE EMBODIMENTS

Preferred embodiments of a facsimile apparatus an electronic mail transmitting method according to the present invention are described with reference to drawings.

Figure 1:
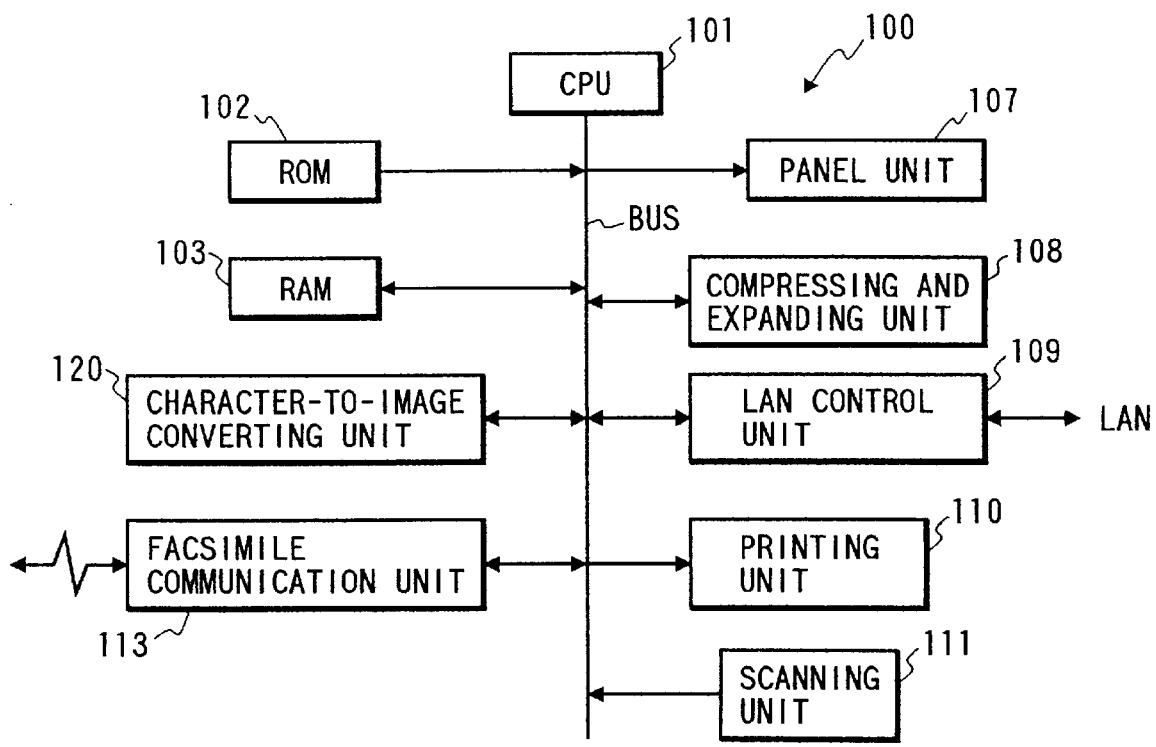
FIG. 1 is a block diagram of a conventional facsimile apparatus in which facsimile data received through a telephone line is transmitted to an address of an electronic mail.
Figure 2:
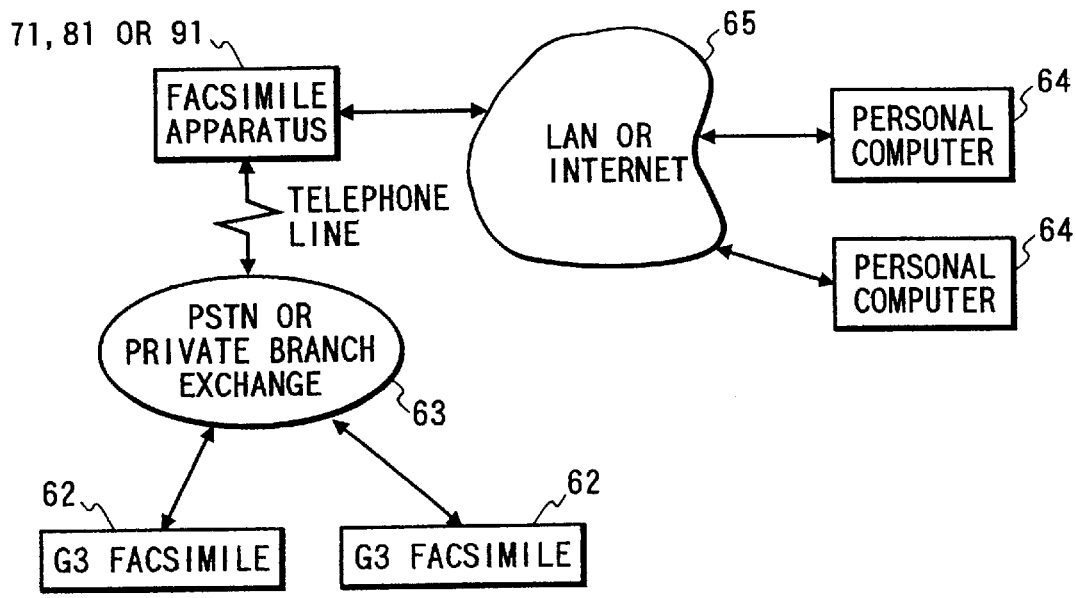
FIG. 2 is a conceptual view of operational circumstances in which a facsimile type electronic mail apparatus is operated.

FIG. 2 is a conceptual view of operational circumstances in which a facsimile type electronic mail apparatus is operated.

As shown in FIG. 2, a facsimile apparatus 71, 81 or 91 according to first to eighth embodiments is operated in operational circumstances in which facsimile data is transmitted from one of a plurality of G3 facsimiles 62 to the facsimile apparatus through a telephone line of a public switched telephone network (PSTN) or a private branch exchange 63 and mail data obtained by converting a facsimile format of the facsimile data to a mail format is transmitted from the facsimile apparatus to one of terminals (or personal computers) 64 through an local area network (LAN) or an internet 65 by an electronic mail. In this case, an ethernet is, for example, used as a protocol for the electronic mail transmitted through the LAN. An information designating one terminal to which the mail data is transmitted is placed at a sub-address of the facsimile data, and the sub-address is prescribed in a T-30 rule of protocol standards for a facsimile transmission. Also, in cases where an error occurs in the transmission of the electronic mail because of an unknown destination of the electronic mail or the like, a facsimile number specifying the G3 facsimile 62 from which the facsimile data is transmitted to the apparatus 71, 81 or 91 is examined, and error information is transmitted from the facsimile apparatus to the G3 facsimile 62. In this case, the facsimile number is known from a transmitting subscriber identification (TSI) included in the facsimile data. The TSI is also prescribed in the T-30 rule of the protocol standards. As is described above, it is applicable that the sub-address and/or the TSI be used for correspondent information included in the facsimile data.

Figure 3:
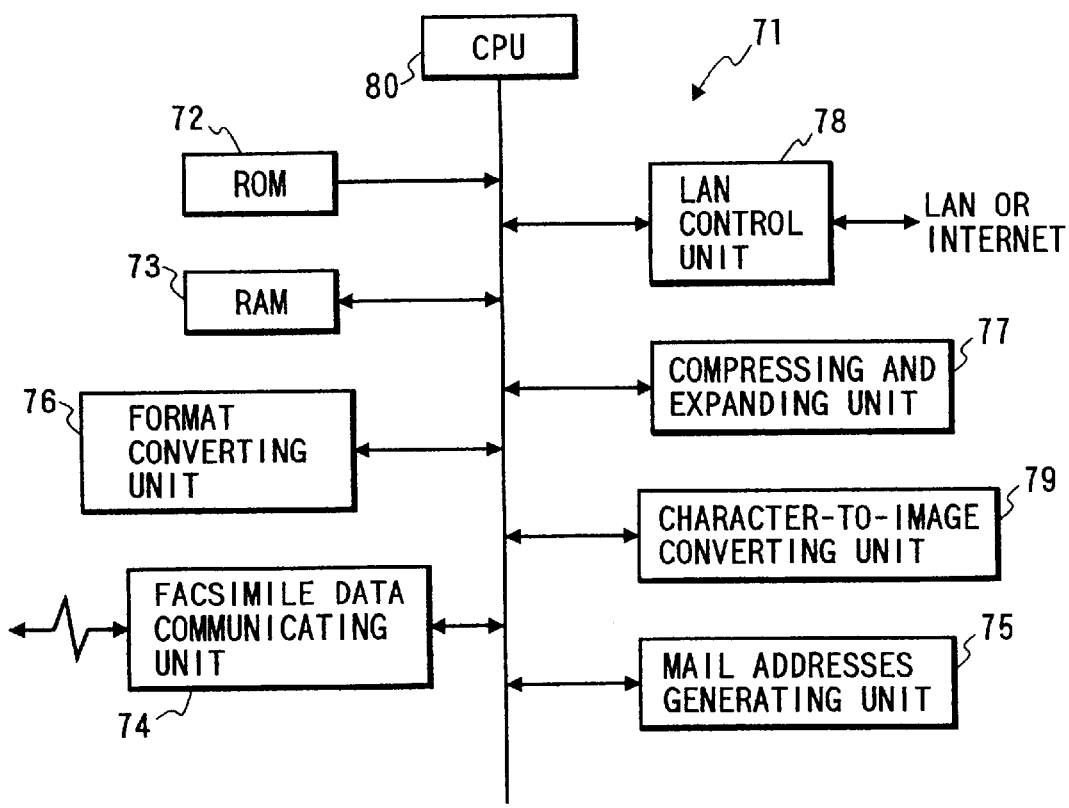
FIG. 3 is a block diagram of a facsimile apparatus according to an first embodiment of the present invention.

FIG. 3 is a block diagram of a facsimile apparatus according to a first embodiment of the present invention.

As shown in FIG. 3, a facsimile apparatus 71 comprises
- a ROM 72 for storing a program,
- a RAM 73 for storing data used for the execution of the program stored in the ROM 72 and storing a corresponding table of a plurality of sets respectively composed of a transmitter's electronic mail address, an informing facsimile number and a receiver's electronic mail address,
- a facsimile data communicating unit 74 for receiving facsimile data transmitted from one facsimile 62 of a transmitter and transmitting either error information indicating the occurrence of an error in the transmission of the facsimile data or a reply mail to the facsimile 62;
- a mail addresses generating unit 75 for generating a transmitter's electronic mail address of the facsimile 62 for each facsimile data to uniquely specify one of the facsimiles 62;
- a format converting unit 76 for converting an image format of the facsimile data to a mail format to change the facsimile data received by the facsimile data communicating unit 74 to mail data and inserting the transmitter's electronic mail address generated in the mail addresses generating unit 75 into the mail data;
- a compressing and expanding unit 77 for compressing the mail data obtained in the format converting unit 76;
- an LAN control unit 78 for transmitting the mail data compressed by the compressing and expanding unit 77 to one personal computer 64 of a receiver by an electronic mail and receiving the error information or the reply mail transmitted from the personal computer 64;
- a character-to-image converting unit 79 for converting a character included in the error information or the reply mail received by the LAN control unit 78 to received image data to transmit the received image data to the facsimile 62 through the facsimile data communicating unit 74; and
- a CPU 80 for controlling the constitutional elements 72 to 79.

In the above configuration of the facsimile apparatus 71, an operation performed by the facsimile apparatus 71 when facsimile data is received is described with reference to FIG. 4.

Figures 4, 5:
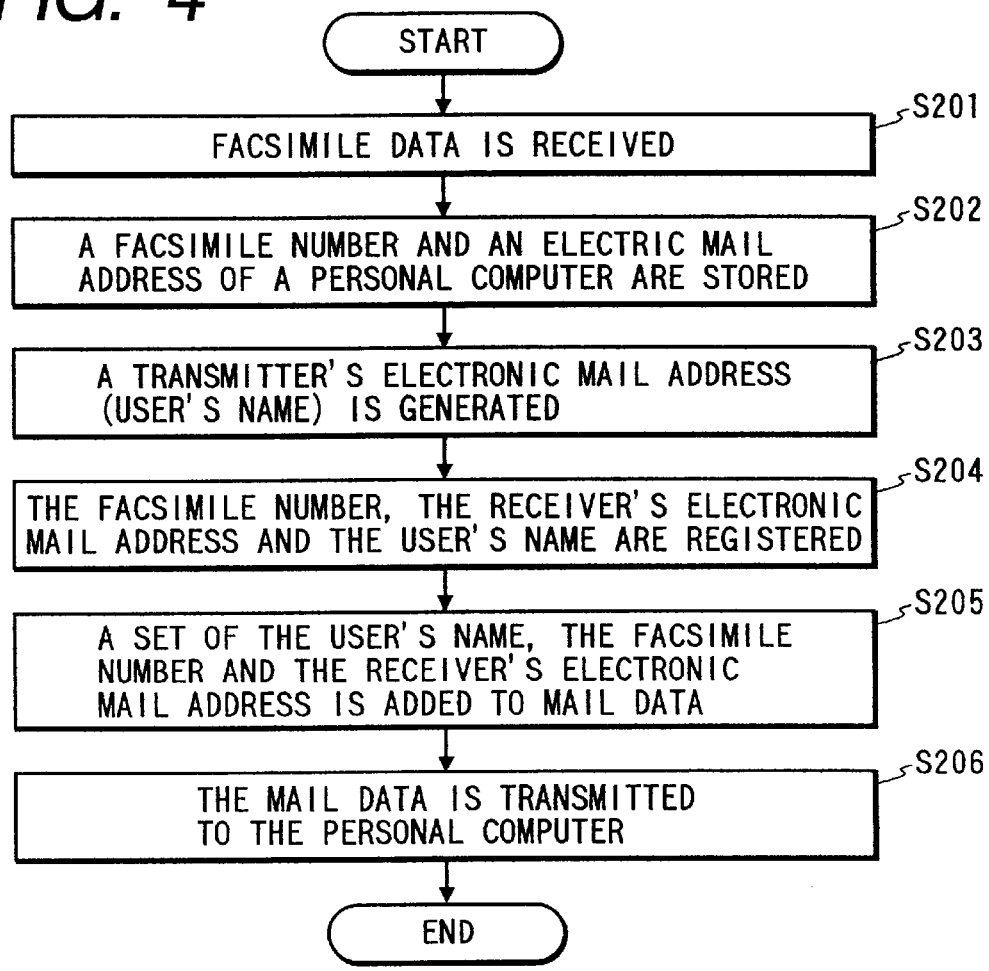
FIG. 4 is a flow chart showing an operation performed by the facsimile apparatus shown in FIG. 3 according to the first embodiment when facsimile data is received in the facsimile apparatus.
FIG. 5 shows a corresponding table of a plurality of sets of transmitter's electronic mail addresses (or user's names), informing facsimile numbers and receiver's electronic mail addresses.

FIG. 4 is a flow chart showing an operation performed by the facsimile apparatus 71 according to the first embodiment when facsimile data is received in the facsimile apparatus 71.

A user (or a transmitter) of one facsimile 62 writes in advance a facsimile number specifying the facsimile 62 in facsimile data as a transmitting subscriber identification.

Also, the user inputs an electronic mail address of one personal computer 64 (or a receiver) in advance in a sub-address placed in the facsimile data. Thereafter, when the facsimile data transmitted from the facsimile 62 is received in the facsimile apparatus 71 (step S201), the facsimile number is extracted from the facsimile data and is stored in the RAM 73 as an informing facsimile number, and the electronic mail address of the personal computer 64 is stored in the RAM 73 as a receiver's electronic mail address (step S202). Because the receiver's electronic mail address is written by using English letters, each English letter is obtained by converting a numeral according to the ASCII code or the like and is stored in a memory (not shown).

Though it is prescribed that a group of numerals can be only used as data stored in the sub-address, because it is expected that the use of a group of English characters in the sub-address is allowed in the future, the receiver's electronic mail address composed of English characters is used in this embodiment. In cases where a company using the facsimile apparatus 71 is the same as that using the facsimile 62, it is applicable that a corresponding table of a group of numerals written in the sub-address and an electronic mail address be registered.

Thereafter, a user's name uniquely specifying the facsimile 62 is generated in the mail addresses generating unit 75 as a transmitter's electronic mail address (step S203). For example, numbers from 1 to 9999 are allocated as the user's name without overlapping the numerals. The user's name is registered in a corresponding table shown in FIG. 5. That is, each of numbers 0001, 0002, - - - , 9999 registered in a column of a transmitter's electronic mail address is one user's name, and an electronic mail address of the facsimile apparatus 71 is expressed by "0002@intfax.mgcs.co.jp". "intfax" is a host name of the facsimile apparatus 71, and "mgcs.co.jp" indicates a domain of a company in which the facsimile apparatus 71 is settled.

Thereafter, the informing facsimile number and the receiver's electronic mail address are registered in the corresponding table in correspondence to the user's name (step S204). The corresponding table is stored in the RAM 73. Thereafter, an image format of the facsimile data received by the facsimile data communicating unit 74 is converted to a mail format by the format converting unit 76 to produce mail data, and a set of the user's name, the informing facsimile number and the receiver's electronic mail address is added to the mail data (step S205). The mail format is obtained by converting the facsimile data to data of a TIFF type (a format for managing an image in a personal computer) and adding a header formed according to MIME (standards for receiving and transmitting data except a text by an electronic mail). Thereafter, the mail data is compressed by the compressing and expanding unit 77 and is transmitted by a transmitter's electronic mail from the LAN control unit 78 to the personal computer 64 specified by the receiver's electronic mail address through the LAN 65 (step S206). When the personal computer 64 receives the electronic mail transmitted from the facsimile apparatus 71, the host name "intfax" of the electronic mail address "0002@intfax.mgcs. co.jp" is recognized by the personal computer 64, and error information or reply information of a receiver's electronic mail is returned to the facsimile apparatus 71 by transmitting the receiver's electronic mail to a destination designated by the host name. In cases where a transmission error occurs in the transmission of the transmitter's electronic mail, error information is transmitted from a gate way placed in the LAN 65 to the facsimile apparatus 71.

Figure 6:
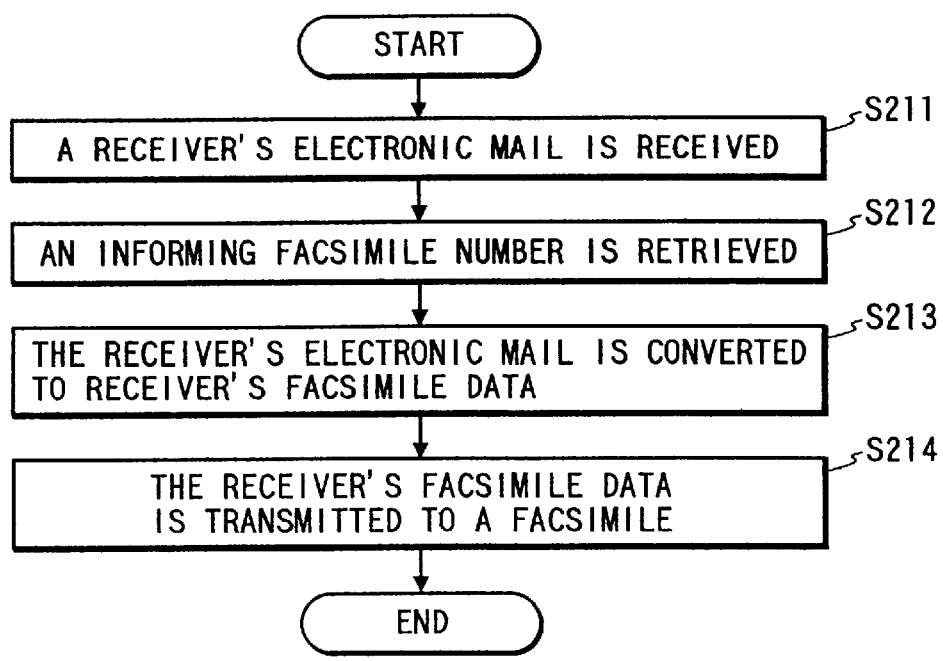
FIG. 6 is a flow chart showing an operation performed by the facsimile apparatus shown in FIG. 3 according to the first embodiment when an electronic mail transmitted from a personal computer of a receiver is returned to a transmitter.

FIG. 6 is a flow chart showing an operation performed by the facsimile apparatus 71 according to the first embodiment when an electronic mail transmitted from the personal computer 64 of the receiver is returned to the transmitter.

When the receiver's electronic mail is received in the LAN control unit 78 (step S211), the user's name "0002" of the electronic mail address "0002@intfax.mgcs.co.jp" is recognized, and the informing facsimile number 03-5434-7088 is retrieved from the corresponding table stored in the RAM 73 according to the user's name "0002" (step S212). In this case, any unknown person cannot send an electronic mail to the facsimile apparatus 71 because the unknown person does not know the user's name "0002".

Thereafter, the receiver's electronic mail is converted to receiver's facsimile data (step S213). In cases where the receiver's electronic mail is composed of characters or English letters, the receiver's electronic mail is converted to receiver's image data in the character-to-image converting unit 79, and the receiver's image data is converted to receiver's facsimile data in the compressing and expanding unit 77. Thereafter, the receiver's facsimile data is transmitted from the FAX data communicating unit 74 to the facsimile 62 specified by the informing facsimile number through a telephone line (step S214).

Accordingly, because the user's name uniquely specifying the facsimile 62 is generated in the mail addresses generating unit 75 as a transmitter's electronic mail address, even though an error occurs in the transmission of the transmitter's electronic mail and error information is returned to the facsimile apparatus 71, the facsimile 62 can be specified according to the user's name, and the error information can be correctly transmitted to the facsimile 62.

In this embodiment, the facsimile number specifying the facsimile 62 is registered in the corresponding table. However, it is applicable that a telephone number, an electronic mail address or information specifying a destination be useful in place of the facsimile number.

Next, a second embodiment according to the present invention is described with reference to FIG. 7.

In the first embodiment, the error information of the receiver's electronic mail is written in English, and the error information is printed as it is by the facsimile 62. In this case, because the error information is printed on a facsimile paper in English, a Japanese person who is not familiar with an electronic mail cannot immediately realize contents of the receiver's electronic mail. Therefore, in the second embodiment, the error information informed in English is translated into Japanese.

Figure 7:
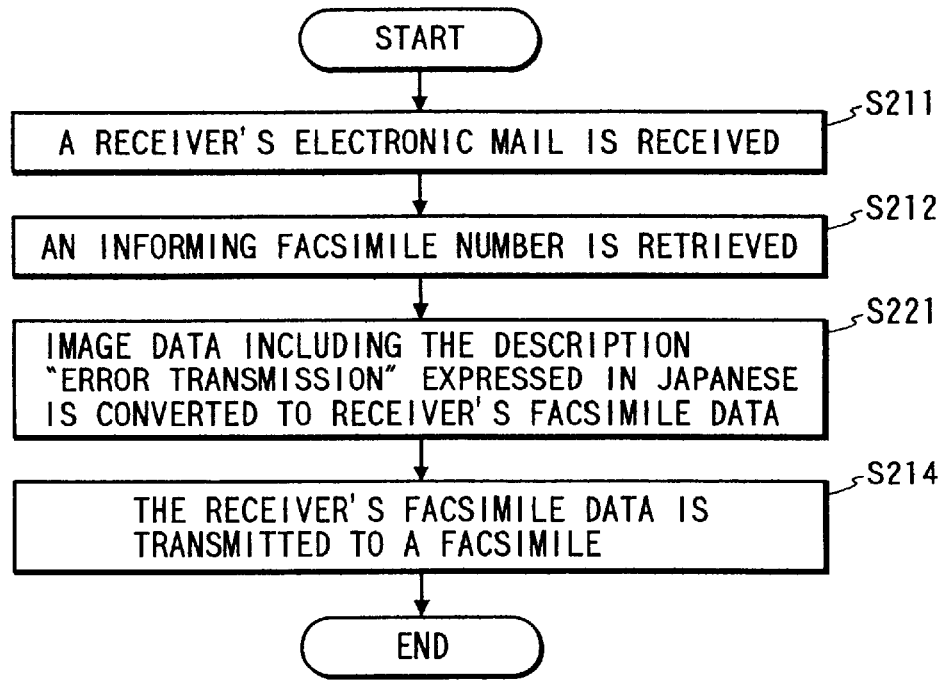
FIG. 7 is a flow chart showing an operation performed by the facsimile apparatus shown in FIG. 3 according to the second embodiment when an electronic mail transmitted from a personal computer of the receiver is returned to the facsimile apparatus.

FIG. 7 is a flow chart showing an operation performed by the facsimile apparatus 71 according to the first embodiment when an electronic mail transmitted from the personal computer 64 is returned to the facsimile apparatus 71.

As shown in FIG. 7, the steps S211 and S212 are performed in the same manner as in the first embodiment. Thereafter, in cases where an error information is included in the receiver's electronic mail or the receiver's electronic mail is transmitted from an electronic mail address not registered in the corresponding table, a description "error transmission" expressed in Japanese is read out from the RAM 73, and the receiver's electronic mail, the description "error transmission" expressed in Japanese and a mail address of the receiver is changed to receiver's image data in the character-to-image converting unit 79, and the image data is converted to receiver's facsimile data (step S221). Thereafter, the receiver's facsimile data is transmitted from the FAX data communicating unit 74 to the facsimile 62 specified by the informing facsimile number through a telephone line (step S214).

Accordingly, even though a Japanese person who is not familiar with an electronic mail receives the error information when he sends an electronic mail to a receiver, he can immediately realize the occurrence of the transmission error when he receives the receiver's facsimile data.

Next, a third embodiment according to the present invention is described with reference to FIG. 8.

In the third embodiment, when a transmitter transmits a facsimile converted to a transmitter's electronic mail to a receiver (or the personal computer 64), a message "Please return a blank electronic mail to a transmitter's electronic mail address written in the transmitter's electronic mail" is inserted into the transmitter's electronic mail. Therefore, a receiver's electronic mail in which a mail address of the receiver and a user's name are written in a header of the receiver's electronic mail and any other contents are not written.

Figure 8:
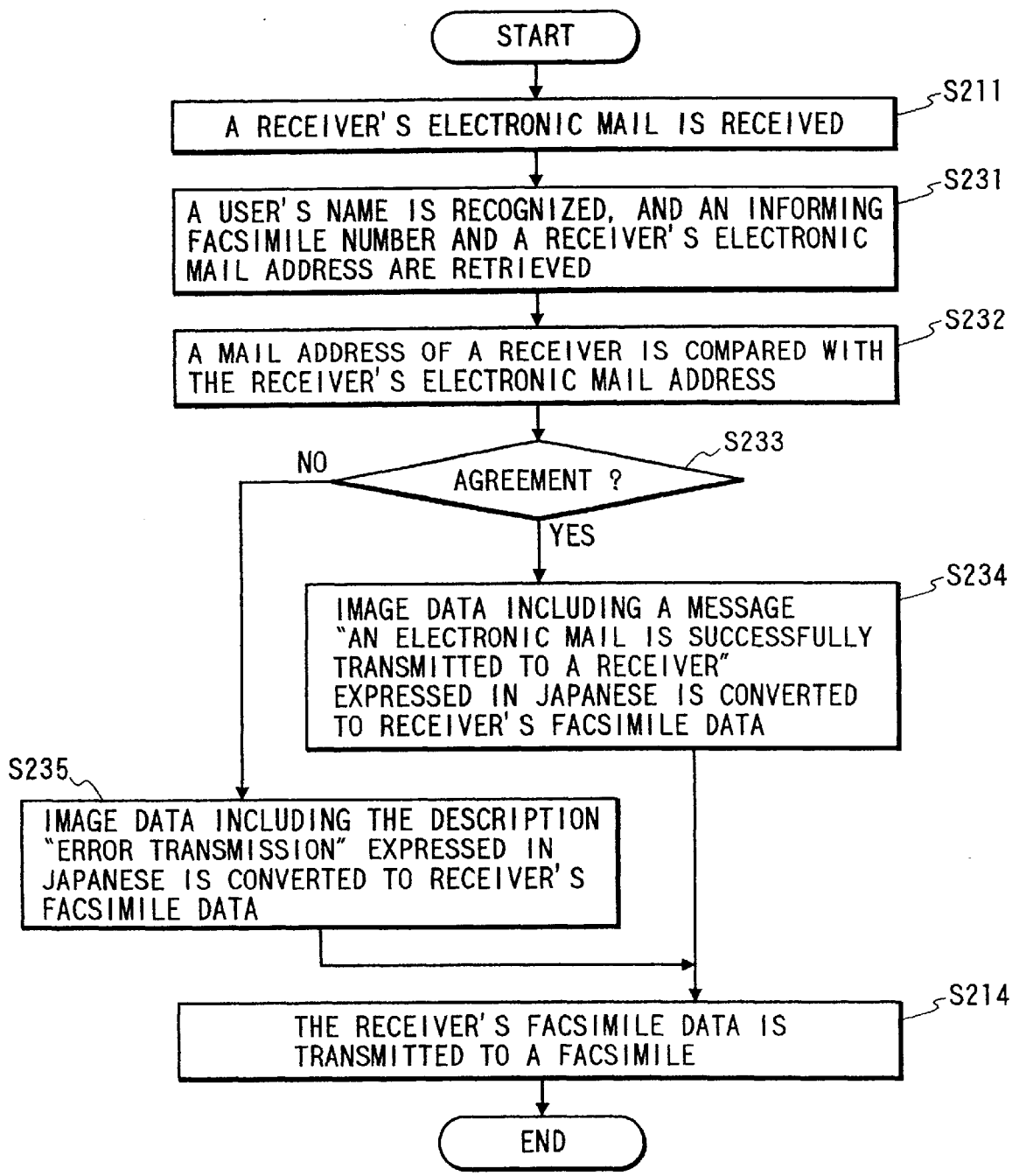
FIG. 8 is a flow chart showing an operation performed by the facsimile apparatus shown in FIG. 3 according to a third embodiment when a receiver's electronic mail transmitted from a personal computer of a receiver is returned to the facsimile apparatus.

FIG. 8 is a flow chart showing an operation performed by the facsimile apparatus 71 according to the third embodiment when a receiver's electronic mail transmitted from the personal computer 64 is returned to the facsimile apparatus 71.

When the receiver's electronic mail is received in the LAN control unit 78 (step S211), the user's name of the receiver's electronic mail address is recognized, and an informing facsimile number and a receiver's electronic mail address are retrieved from the corresponding table stored in the RAM 73 according to the user's name (step S231). Thereafter, the mail address of the receiver written in the header of the receiver's electronic mail by the receiver is compared with the receiver's electronic mail address retrieved from the corresponding table (step S232). Thereafter, it is judged in the CPU 80 whether or not the mail address of the receiver agrees with the receiver's electronic mail address (step S233).

In cases where the mail address of the receiver agrees with the receiver's electronic mail address, because the transmitter's electronic mail is correctly received by the receiver, a particular message "an electronic mail is successfully transmitted to a receiver" expressed in Japanese is read out from the RAM 73, and the particular message and the mail address of the receiver is changed to receiver's image data in the character-to-image converting unit 79, and the image data is converted to receiver's facsimile data (step S234). In contrast, in cases where the mail address of the receiver does not agree with the receiver's electronic mail address (step S233), because the transmitter's electronic mail is received by a wrong receiver, a description "error transmission" expressed in Japanese is read out from the RAM 73, and the description "error transmission" expressed in Japanese and the mail address of the receiver is changed to receiver's image data in the character-to-image converting unit 79, and the image data is converted to receiver's facsimile data (step S235). Thereafter, the receiver's facsimile data is transmitted from the FAX data communicating unit 74 to the facsimile 62 specified by the informing facsimile number through a telephone line (step S214).

Accordingly, when a correct receiver successfully receives an electronic mail transmitted from a transmitter, the transmitter can ascertain that the receiver actually reads contents of the transmitter's electronic mail.

Next, a fourth embodiment according to the present invention is described with reference to FIG. 9.

In cases where a transmission error of an electronic mail occurs in a transmitter's electronic mail, error information is immediately returned to a transmitter in general. Therefore, in cases where error information is not returned to a transmitter even though a prescribed time elapses after the transmission of an electronic mail, it is assumed that the electronic mail is successfully received by a receiver. In this case, a set of a user's name, an informing facsimile number and a receiver's electronic mail address registered in the corresponding table as a record of the transmitter's electronic mail is not required. Therefore, the record is deleted from the corresponding table after a prescribed time elapses.

Figure 9:
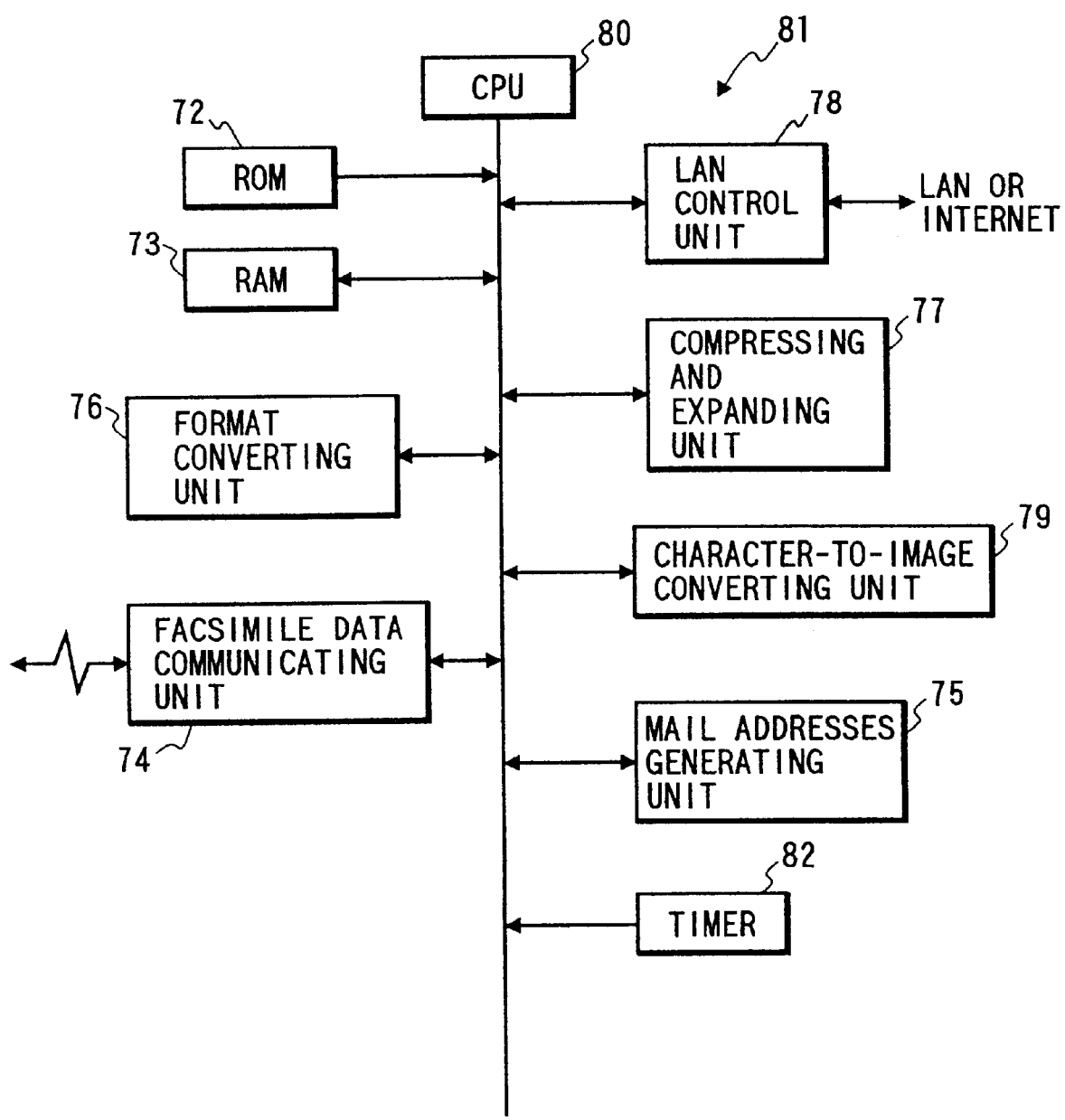
FIG. 9 is a block diagram of a facsimile apparatus according to an fourth embodiment of the present invention.

FIG. 9 is a block diagram of a facsimile apparatus according to a fourth embodiment of the present invention.

As shown in FIG. 9, a facsimile apparatus 81 comprises the ROM 72, the RAM 73, the facsimile data communicating unit 74, the mail addresses generating unit 75, the format converting unit 76, the compressing and expanding unit 77, the LAN control unit 78, the character-to-image converting unit 79, the CPU 80 and a timer 82 for measuring an elapsed time to delete a record registered in the corresponding table of the RAM 73 when a prescribed time like 24 hours elapses after the record is stored in the RAM 73 under the control of the CPU 80.

In the above configuration of the facsimile apparatus 81, after an informing facsimile number and a receiver's electronic mail address are registered in the corresponding table as a particular record in correspondence to a user's name in the step S204 of FIG. 4, an elapsed time is measured by the timer 82. When a prescribed time like 24 hours elapses after the particular record is registered in the corresponding table, the particular record is deleted from the corresponding table.

Accordingly, because a set of a user's name, an informing facsimile number and a receiver's electronic mail address denoting a record of a transmitter's electronic mail is deleted when a prescribed time elapsed after the record is registered in the corresponding table, a volume of records registered in the corresponding table is not enormously increased. Therefore, the number of facsimiles 62 (or transmitters) is not limited even though a memory capacity allocated to the corresponding table is limited.

Next, an operation performed in the facsimile apparatus 71 is described according to a fifth embodiment of the present invention.

When a receiver's electronic mail is returned to the LAN control unit 78 as a reply of a transmitter's electronic mail in the step S211 of FIG. 6, an informing facsimile number is retrieved from the corresponding table stored in the RAM 73 in the step S212, the receiver's electronic mail is converted to receiver's facsimile data in the step S213, and the receiver's facsimile data is transmitted to one facsimile 62 specified by the informing facsimile number in the step S214. Thereafter, a set of a user's name, an informing facsimile number and a receiver's electronic mail address denoting a record of the transmitter's electronic mail is deleted.

Accordingly, because a set of a user's name, an informing facsimile number and a receiver's electronic mail address denoting a record of a transmitter's electronic mail is deleted each time a reply of the transmitter's electronic mail is returned to a facsimile 62, a volume of records registered in the corresponding table is not enormously increased. Therefore, the number of facsimiles 62 (or transmitters) is not limited even though a memory capacity allocated to the corresponding table is limited.

Also, in cases where a concept of the fourth embodiment and a concept of the fifth embodiment are combined, the corresponding table can be moreover effectively managed.

Next, an operation performed in the facsimile apparatus 71 is described with reference to FIG. 10 according to a sixth embodiment of the present invention.

In this embodiment, a receiver who receives a transmitter's electronic mail manages a record of the corresponding table. That is, in cases where the receiver intends to delete a particular record corresponding to the transmitter's electronic mail, a word "deletion" is inserted into a receiver's electronic mail transmitted to a transmitter as a reply, and the particular record registered in the corresponding table is deleted according to the word "deletion" under the control of the CPU 80.

Figure 10:
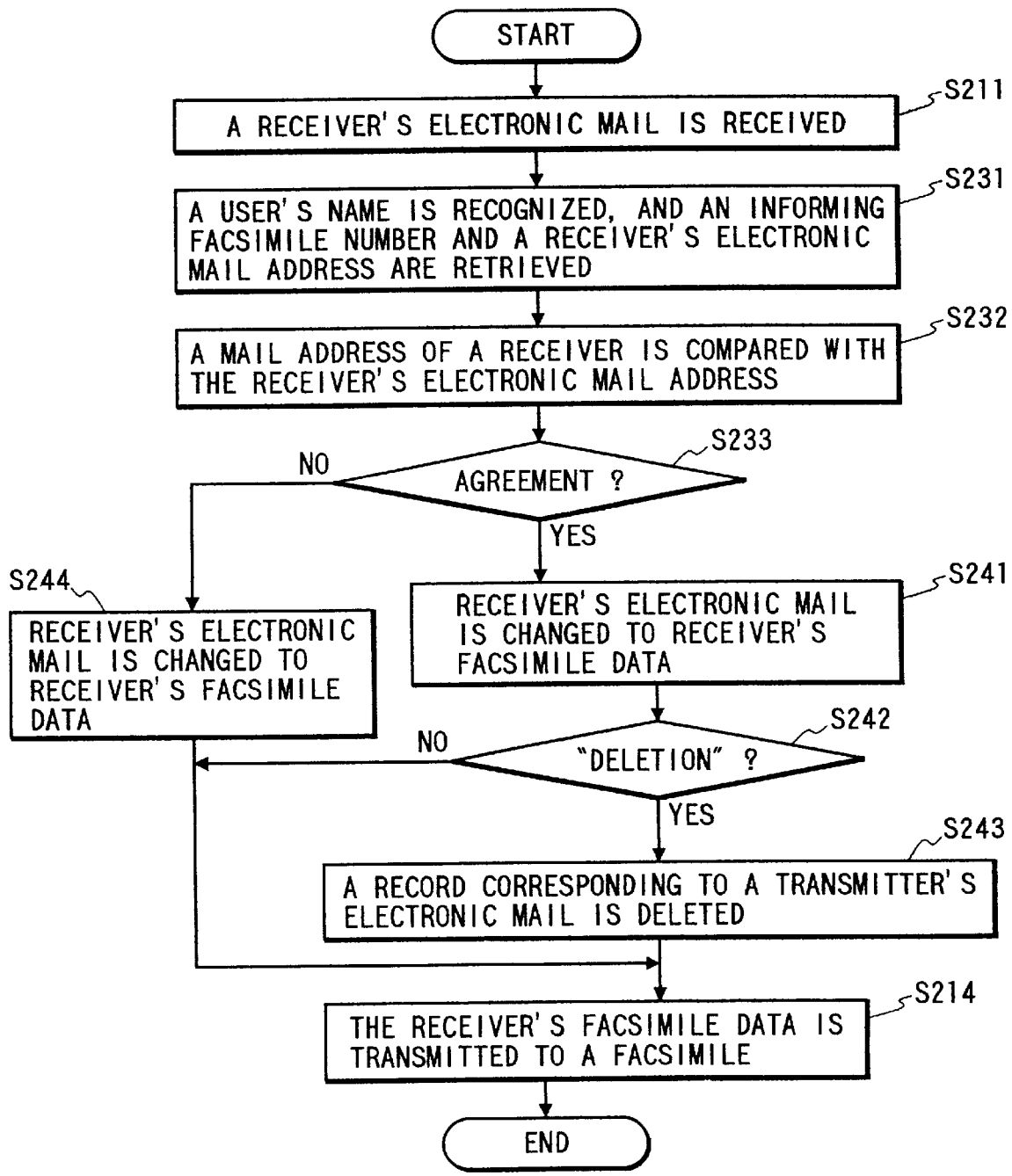
FIG. 10 is a flow chart showing an operation performed by the facsimile apparatus shown in FIG. 3 according to a sixth embodiment when a receiver's electronic mail transmitted from a personal computer of a receiver is returned to the facsimile apparatus.

FIG. 10 is a flow chart showing an operation performed by the facsimile apparatus 71 according to the sixth embodiment when a receiver's electronic mail transmitted from the personal computer 64 is returned to the facsimile apparatus 71.

The steps S211, S231, S232 and S233 are performed in the same manner as in the third embodiment. In this case, in cases where the receiver intends to delete a particular record corresponding to the transmitter's electronic mail, a word "deletion" is inserted into a receiver's electronic mail. In cases where the mail address of the receiver agrees with the receiver's electronic mail address (step S233), a receiver's electronic mail is changed to receiver's image data in the character-to-image converting unit 79, and the receiver's image data is converted to receiver's facsimile data (step S241). Thereafter, it is judged in the CPU 80 whether or not the word "deletion" is inserted into the receiver's facsimile data (step S242). In cases where the word "deletion" is inserted into the receiver's facsimile data, a record corresponding to the transmitter's electronic mail is deleted from the corresponding table (step S243), and the receiver's facsimile data is transmitted to one facsimile 62 specified by the informing facsimile number in the step S214. In contrast, in cases where the word "deletion" is not inserted into the receiver's facsimile data, the receiver's facsimile data is transmitted to one facsimile 62 in the step S214 without deleting the record.

In contrast, in cases where the mail address of the receiver does not agree with the receiver's electronic mail address (step S233), the receiver's electronic mail is changed to receiver's image data in the character-to-image converting unit 79, and the receiver's image data is converted to receiver's facsimile data (step S244). Thereafter, the receiver's facsimile data is transmitted to one facsimile 62 in the step S214.

Accordingly, because a record corresponding to the transmitter's electronic mail is deleted from the corresponding table in cases where the receiver intends to delete the record, the receiver can manage the corresponding table stored in the RAM 73. That is, the receiver can return a receiver's electronic mail any time to the facsimile 62 through the facsimile apparatus 71, or the receiver can transmit a receiver's electronic mail many times to the facsimile 62 through the facsimile apparatus 71 until the word "deletion" is inserted into the receiver's facsimile data by the receiver.

Next, a seventh embodiment according to the present invention is described with reference to FIGS. 11 and 12.

In this embodiment, a replay or transmission error information for facsimile data transmitted to a receiver is received by a telephone of a transmitter.

Figure 11:
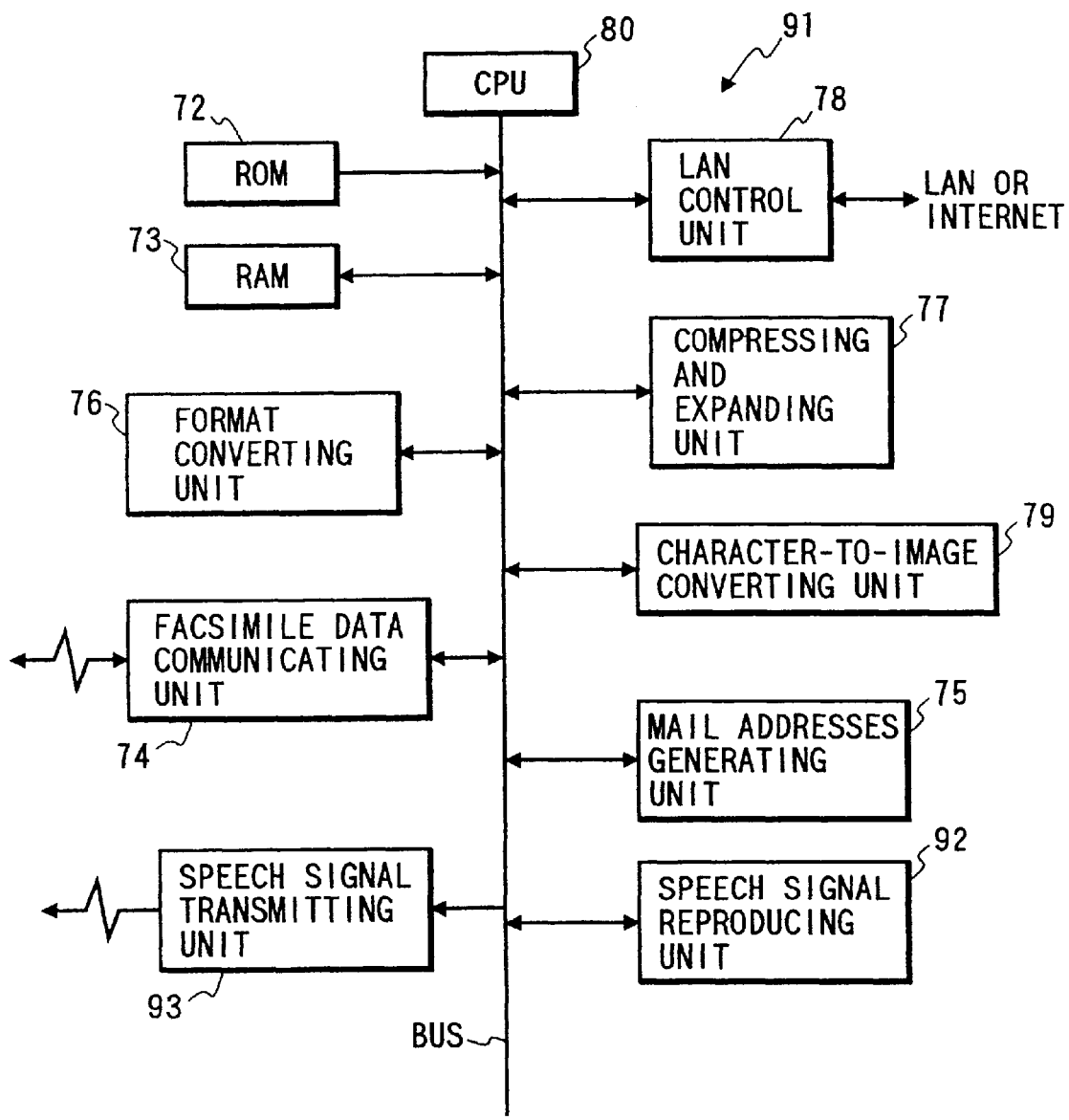
FIG. 11 is a block diagram of a facsimile apparatus according to a seventh embodiment of the present invention.

FIG. 11 is a block diagram of a facsimile apparatus according to a seventh embodiment of the present invention.

As shown in FIG. 11, a facsimile apparatus 91 comprises the ROM 72, the RAM 73 for storing data used for the execution of the program stored in the ROM 72, storing a corresponding table of a plurality of sets respectively composed of a transmitter's electronic mail address, an informing telephone number and a receiver's electronic mail address, storing a speech file of a speech signal indicating a message "successful transmission" and another speech file of a speech signal indicating a message "transmission error", the facsimile data communicating unit 74, the mail addresses generating unit 75, the format converting unit 76, the compressing and expanding unit 77, the LAN control unit 78, the character-to-image converting unit 79, the CPU 80, a speech signal reproducing unit 92 for reproducing the speech signal indicating the message "successful transmission" or the speech signal indicating the message "transmission error" from the speech file stored in the RAM 73, and a speech signal transmitting unit 93 for transmitting the speech signal reproduced by the speech signal reproducing unit 92 to a telephone specified by a telephone number corresponding to a transmitter's electronic mail.

In the above configuration of the facsimile apparatus 91, before a transmitter transmits facsimile data, an informing telephone number of the transmitter is registered as a transmitter's identification number of the facsimile data in advance. Also, a receiver's electronic mail address and the telephone number partitioned by a symbol # are written in a sub-address of the facsimile data in advance. Thereafter, when the facsimile data is received by the facsimile data communicating unit 74 of the facsimile apparatus 91, a set of a transmitter's electronic mail address generated by the mail addresses generating unit 75, the informing telephone number and the receiver's electronic mail address is registered in the corresponding table.

FIG. 12 is a flow chart showing an operation performed by the facsimile apparatus 91 according to the seventh embodiment when a receiver's electronic mail transmitted from the personal computer 64 is returned to the facsimile apparatus 91.

When a receiver's electronic mail is returned to the LAN control unit 78 as a reply of a transmitter's electronic mail in the step S211, the transmitter's electronic mail address (or a user's name), the informing telephone number and the receiver's electronic mail address are retrieved from the corresponding table stored in the RAM 73 (step S251). Thereafter, a mail address of the receiver written in the header of the receiver's electronic mail by the receiver is compared with the receiver's electronic mail address retrieved from the corresponding table (step S252). Thereafter, it is judged in the CPU 80 whether or not the mail address of the receiver agrees with the receiver's electronic mail address (step S253).

In cases where the mail address of the receiver agrees with the receiver's electronic mail address, a speech file of a speech signal indicating a message "successful transmission" is read out from the RAM 73 and is combined with the receiver's electronic mail address (step S254). Thereafter, the speech signal indicating the message "successful transmission" is reproduced from the speech file by the speech signal reproducing unit 92, and the speech signal is transmitted to a telephone specified by the informing telephone number through the speech signal transmitting unit 93 (step S255).

In contrast, in cases where the mail address of the receiver does not agree with the receiver's electronic mail address, a speech file of a speech signal indicating a message "transmission error" is read out from the RAM 73 and is combined with the receiver's electronic mail address (step S256).

Thereafter, the speech signal indicating the message "transmission error" is reproduced from the speech file by the speech signal reproducing unit 92, and the speech signal is transmitted to the telephone specified by the informing telephone number through the speech signal transmitting unit 93 (step S255).

Accordingly, in cases where the transmitter's electronic mail is correctly received by the receiver, the transmitter can hear the speech message "successful transmission" on the telephone. Also, in cases where a transmission error occurs in the transmission of the transmitter's electronic mail, the transmitter can hear the speech message "transmission error" on the telephone. Therefore, the transmitter can easily know the successful transmission or the transmission error.

Next, an operation performed in the facsimile apparatus 91 is described with reference to FIG. 13 according to an eighth embodiment of the present invention.

In this embodiment, before a transmitter transmits facsimile data through his facsimile 62, an informing electronic mail address of the transmitter is registered as a transmitter's identification number of the facsimile data in advance. The informing electronic mail address indicates a first personal computer 64 of the transmitter. Also, a receiver's electronic mail address and the informing electronic mail address partitioned by a symbol # are written in a sub-address of the facsimile data in advance. The receiver's electronic mail address specifies a second personal computer 64.

FIG. 13 is a flow chart showing an operation performed by the facsimile apparatus 71 according to the eighth embodiment when facsimile data is received in the facsimile apparatus 71.

When the facsimile data transmitted from one facsimile 62 is received in the facsimile apparatus 71 (step S201), the receiver's electronic mail address and the informing electronic mail address written in the facsimile data are recognized (step S261), a format of the facsimile data is converted to a mail format to change the facsimile data to a transmitter's electronic mail (step S262), the informing mail address of the transmitter is registered in a header of the transmitter's electronic mail as a transmitter's electronic mail address (step S263), and the transmitter's electronic mail is transmitted from the LAN control unit 78 to the second personal computer 64 specified by the receiver's electronic mail address through the LAM (or internet) 65 (step S264).

Thereafter, a receiver's electronic mail indicating a reply of the transmitter's electronic mail or error information is directly transmitted from the second personal computer 64 to the first personal computer 64 of the transmitter without passing the facsimile apparatus 71.

Accordingly, because the receiver's electronic mail can be received by the personal computer 64 of the transmitter, transmission error information or successful transmission information can be directly informed the transmitter without passing the information through the facsimile apparatus 71.

Also, because the receiver's electronic mail is changed to receiver's facsimile data in the facsimile apparatus 71, 81 or 91 in the first to sixth embodiments, in cases where the transmitter intends to display the receiver's facsimile data on the first personal computer 64, it is required to read an image of the receiver's facsimile data with a scanner and transmit the image to the first personal computer 64 of the transmitter. Therefore, it is troublesome to display the receiver's facsimile data on the first personal computer 64 in the first to sixth embodiments. However, because the receiver's electronic mail is received by the personal computer 64, the transmitter can easily display the receiver's electronic mail on his personal computer 64.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A facsimile apparatus, comprising:

facsimile receiving means for receiving facsimile data;

recognizing means for recognizing a transmitter's address representing facsimile number and a receiver's electronic mail address which are included in the facsimile data received by the facsimile receiving means;

generating means for generating an electronic mail address specified by the facsimile apparatus in response to reception of said facsimile data by said facsimile receiving means;

storing means for storing a set of correspondent data comprising all of the transmitter's address and the receiver's electronic mail address recognized by the recognizing means and the specified electronic mail address generated by said generating means;

changing means for changing the facsimile data received by the facsimile receiving means to electronic mail data;

electronic mail transmitting means for transmitting the electronic mail data changed by the changing means; and control means for adding the specified electronic mail address stored in the storing means to the electronic mail data as transmitter's information and controlling the electronic mail transmitting means to transmit the electronic mail data changed by the changing means together with the added specified electronic mail address.

2. A facsimile apparatus according to claim 1, further comprising:

electronic mail receiving means for transmitting an electronic mail to the transmitter's address, which is stored in the storing means in correspondence to the electronic mail address, when the electronic mail transmitted to the specified electronic mail address stored in the storing means is received.

3. A facsimile apparatus according to claim 1 in which the recognition of the recognizing means is performed according to a sub-address of a facsimile signal or a transmitting subscriber identification signal.

4. A facsimile apparatus according to claim 1 in which the recognizing means recognizes the transmitter's address according to a transmitting subscriber identification signal.

5. A facsimile apparatus comprising:

facsimile receiving means for receiving facsimile data;

recognizing means for recognizing a transmitter's address and a receiver's electronic mail address which are included in the facsimile data received by the facsimile receiving means;

storing means for storing the transmitter's address and the receiver's electronic mail address recognized by the recognizing means and an electronic mail address specified in the facsimile apparatus in correspondence to each other;

changing means for changing the facsimile data received by the facsimile receiving means to electronic mail data;

electronic mail transmitting means for transmitting the electronic mail data changed by the changing means; and control means for adding the specified electronic mail address stored in the storing means to the electronic mail data as transmitter's information and controlling the electronic mail transmitting means to transmit the electronic mail data changed by the changing means with the specified electronic mail address, in which the specified electronic mail address stored in the storing means in correspondence to the transmitter's address and the receiver's electronic mail address is deleted in cases where a prescribed condition is satisfied.

6. A facsimile apparatus according to claim 5 in which the prescribed condition is that an elapsed time reaches a prescribed time.

7. A facsimile apparatus according to claim 5 in which the prescribed condition is to inform the transmitter's address after the reception of an error mail.

8. A facsimile apparatus, comprising:

facsimile receiving means for receiving facsimile data;

recognizing means for recognizing a receiver's electronic mail address of the facsimile data received by the facsimile receiving means;

storing means for storing the receiver's electronic mail address recognized by the recognizing means and an electronic mail address specified in the facsimile apparatus in correspondence to each other;

changing means for changing the facsimile data received by the facsimile receiving means to electronic mail data; and electronic mail transmitting means for setting the specified electronic mail address stored in the storing means as a transmitter's address of the electronic mail data changed by the changing means and transmitting the electronic mail data with the specified electronic mail address.

9. A facsimile apparatus, comprising:

a facsimile data communicating unit for receiving facsimile data;

a mail address generating unit for generating an electronic mail address to be able to be specified in the facsimile apparatus when the facsimile data is received by the facsimile data communicating unit;

a random access memory for storing a set of correspondent data comprising all of a transmitter's address representing a facsimile number and a receiver's electronic mail address, which are included in the facsimile data received by the facsimile data communicating unit, and the specified electronic mail address generated by the mail address generating unit;

a format converting unit for converting the facsimile data received by the facsimile data communicating unit into electronic mail data;

a local area network control unit for transmitting the electronic mail data converted by the format converting unit; and a central processing unit for recognizing the transmitter's address and the receiver's electronic mail address of the facsimile data received by the facsimile data communicating unit, controlling the random access memory to store all of the specified electronic mail address generated by the mail address generating unit, the recognized transmitter's address and the recognized receiver's electronic mail address as said set of correspondent data, adding the specified electronic mail address generated by the mail address generating unit to the electronic mail data converted by the format converting unit as transmitter's information and controlling the local area network control unit to transmit the electronic mail data with the specified electronic mail address.

10. An electronic mail transmitting method, comprising the steps of:

receiving facsimile data;

recognizing a transmitter's address representing a facsimile number from the received facsimile data;

generating an electronic mail address specified by a facsimile apparatus in response to reception of said facsimile data;

storing a set of correspondent data comprising all of the transmitter's address, a receiver's electronic mail address and said specified electronic mail address;

changing the received facsimile data into electronic mail data;

setting the specified electronic mail address as a transmitter address of the electronic mail data; and transmitting the electronic mail data together with the specified electronic mail address as a first electronic mail.

11. An electronic mail transmitting method according to claim 10, further comprising the step of:

transmitting a second electronic mail to the transmitter's address corresponding to the specified electronic mail address when the second electronic mail transmitted to the specified electronic mail address is received after the transmission of the first electronic mail.

12. A facsimile apparatus, comprising:

a central processing unit for controlling a facsimile communication unit, a local area network control unit, a format converting section, and a memory, wherein said central processing unit obtains a transmitter's address and a receiver's electronic mail address from facsimile data when said facsimile communication unit receives a facsimile;

said central processing unit generates only one electronic mail address specified by said facsimile apparatus;

said central processing unit causes said memory to store a set of correspondent data comprising all of the transmitter's address, the receiver's electronic mail address, and the specified electronic mail address;

said central processing unit causes said format converting section to convert the received facsimile data into electronic mail data; and said central processing unit controls said local area network control unit to transmit an electronic mail containing said converted electronic mail data, said electronic mail being directed from said specified electronic mail address to said receiver's electronic mail address.

* * * * *